(No Model.)
F. T. SNYDER.
BRAKE ATTACHMENT FOR BICYCLES.
No. 508,490. Patented Nov. 14, 1893.
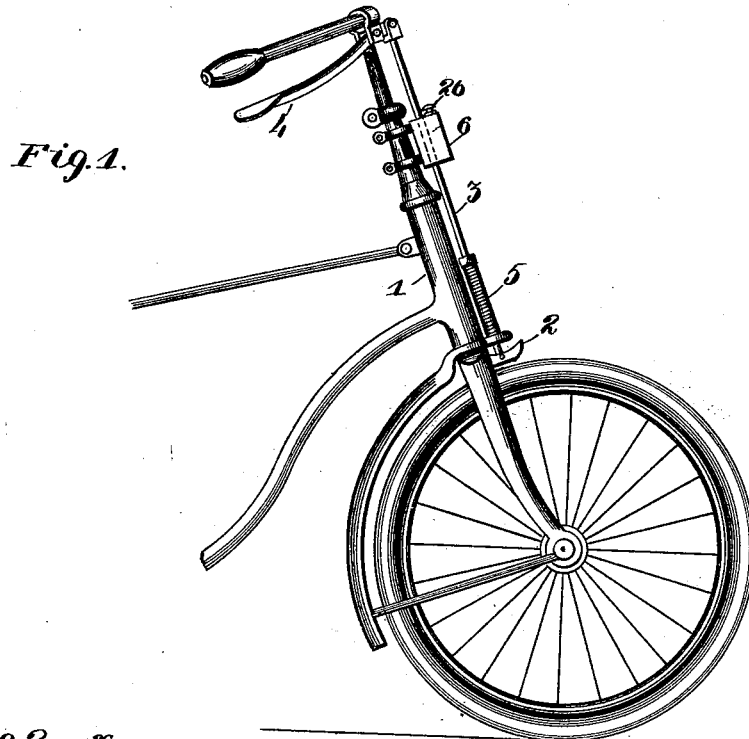
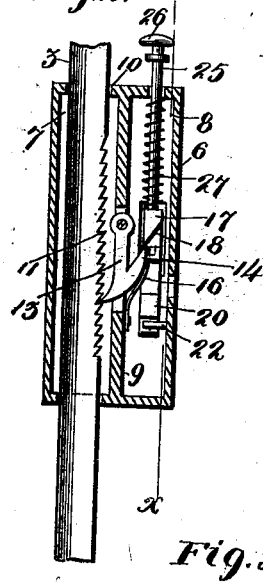
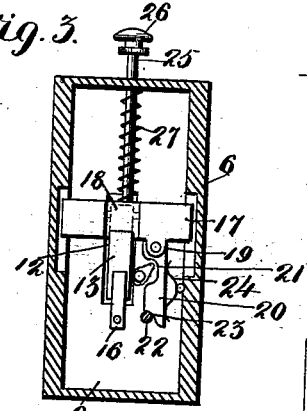
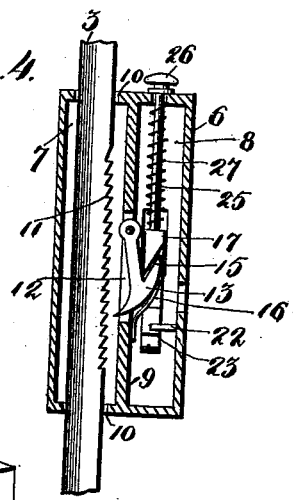
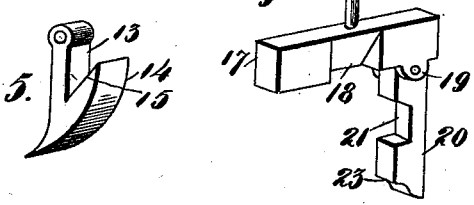
Witnesses
James J. O'Donohoe
Edw. Beckmann Jr.
Inventor
Frank T. Snyder
By his Attorneys
Keller & Starek
THE NATIONAL LITHOGRAPHING COMPANY,
WASHINGTON, D. C.

UNITED STATES PATENT OFFICE.

FRANK T. SNYDER, OF ST. LOUIS, MISSOURI, ASSIGNOR OF ONE-HALF TO NICHOLAS W. HERSHMAN, OF SAME PLACE.

BRAKE ATTACHMENT FOR BICYCLES.

SPECIFICATION forming part of Letters Patent No. 508,490, dated November 14, 1893.

Application filed March 3, 1893. Serial No. 464,487. (No model.)

*To all whom it may concern:*

Be it known that I, FRANK T. SNYDER, of the city of St. Louis, in the State of Missouri, have invented certain new and useful Improvements in Brake Attachments for Bicycles, of which the following is a full, clear, and exact description, reference being had to the accompanying drawings, forming a part hereof.

My invention has relation to brake attachments for bicycles and other vehicles and consists in the novel arrangement and combination of parts more particularly set forth in the specification and pointed out in the claims.

In the drawings, Figure 1 is a side elevation of the forward part of a bicycle having my invention applied thereto. Fig. 2 is a vertical longitudinal section of my complete invention. Fig. 3 is a transverse section taken on the line $x$—$x$ of Fig. 2. Fig. 4 is a vertical longitudinal section similar to Fig. 2 showing the parts in a different position. Fig. 5 is a perspective view of the pawl, and Fig. 6 is a perspective view of the lock co-operating with the pawl.

The object of my invention is to construct an attachment which is adapted to be clamped to the front fork of a bicycle, through which attachment the brake rod passes, the parts being so constructed and arranged that when the brake is employed ordinarily said attachment has no effect upon the brake; but when it is desired to lock the brake shoe against the tire of the wheel, a knob or other like device is operated, and the brake applied.

The invention is intended to dispense with the ordinary chain and padlock and similar devices generally employed to lock the wheels and prevent the cycle from being carried off by unauthorized persons. It will be understood that a key is employed to release the brake shoe from its locked position against the tire of the wheel when cycling is resumed.

Referring to the drawings, 1 represents the front fork of the machine, 2 the brake shoe, 3 the brake rod, 4 the brake lever for operating the brake rod, and 5 a coiled spring for holding the brake shoe out of contact with the tire of the wheel, all of which parts are of well known construction.

My invention consists of a casing 6 which is adapted to be clamped to the front fork of the bicycle as shown in Fig. 1. The said casing is divided into two compartments 7 and 8 the same being formed by the division wall 9; and, formed in the casing at the ends of the compartment 7 are openings 10 through which the brake rod 3 loosely passes. The brake rod in this instance is provided with ratchet teeth 11 which are normally located within the casing, and with which a suitable pawl hereinafter described co-operates. Formed in the divisional wall 9 is an elongated opening 12 within which is movably secured one end of a pawl 13. Said pawl is provided with an extension 14 having an inner inclined surface 15, and fixed to the said wall is one end of a flat spring 16 the free end of which bears against the said pawl and is designed to hold the engaging end of the same in contact with the ratchet teeth formed on the brake rod as shown in Fig. 2.

17 represents a bar having an inclined surface 18 which co-operates with the inclined surface 15 formed on the pawl, and 19 represents lugs forming a part of the said bar to which is secured one end of a movable latch 20. The said latch is provided with a depression 21 against which the end of a key is brought in contact as shown in dotted lines in Fig. 3 when it is desired to bring the inclined surfaces 18 and 15 of the bar and pawl respectively together for releasing the said pawl from its engaging position as shown in Fig. 4. Fixed to the inner wall of the casing 6 is a pin 22 upon which rests the shoulder 23 formed on the lower end of the latch 20 when the bar 17 is in its highest position, or practically out of contact with the pawl 13, thus allowing the bar to be depressed only when the key is applied. The latch 20 is held in its normal position by the spring 24 and causes the same to assume the position as shown in Fig. 3 when the bar 17 is in its highest position, the shoulder 23 of the latch resting upon the pin 22. When however, the key is applied and turned, the same is brought in contact with the depression 21 and first operates to depress the latch sufficiently to disengage the pin 22, and afterward to pull down the bar 17, operating as an ordinary key and lock. Attached to the upper surface of the bar 17 is a rod 25 which passes through the top of the casing 6 and carries a knob 26 or similar device for operating the bar 17 or for more properly elevating the same only. Encircling the bar 25, and interposed between the bar 17 and the top of the casing 6 is a coiled spring 27 which operates to hold the said bar in its engaging position as shown in Fig. 4.

When the brake rod 3 is operated under ordinary conditions, that is, for simply applying the brakes, the mechanism is located in the position as shown in Fig. 4 causing the engaging end of the pawl 13 to be out of contact with the ratchet teeth 11 on the brake rod. When however, it is desired to lock the brake shoe 2 permanently against the tire, thus enabling the operator to leave his machine in the street and prevent unauthorized persons from wheeling the same away, the rod 25 is pulled up, at the same time elevating the bar 17, thus releasing the pawl 13 and allowing the spring 16 to force said pawl against the ratchet teeth 11 formed on the brake rod 3 as shown in Fig. 2. Of course when the parts are in this position, any additional power may be applied to the brake lever 4 and the brake shoe 2 to more thoroughly clamp the latter upon the tire. Under no circumstances however can the pawl 13 be released from its engaged position without the employment of the key referred to, as a downward pressure upon the knob 26 when the same is in its highest position has no effect upon the bar 17 as the shoulder 23 of the latch 20 rests upon the pin 22, and the latch can be only released from said position by the key as before described. The casing here described can also be used as a support for the lamp usually carried on bicycles at night.

I do not limit myself to the precise details here described, and the construction may be varied in many respects without departing from the spirit of my invention; neither is the improvement limited in its application to bicycles but may be used on other vehicles having brakes with like results.

Having fully described my invention, what I claim is—

1. A brake attachment for bicycles comprising an ordinary brake rod, ratchet teeth formed on the same, a pawl co-operating with said teeth, a bar for operating said pawl in one direction, a spring for operating the pawl in the opposite direction, and means attached to said bar and adapted to be operated by a key, substantially as set forth.

2. A brake attachment for bicycles comprising an ordinary brake rod and its attachments, ratchet teeth formed on said rod, a pawl co-operating with said teeth and actuated in one direction by a spring, a bar for operating the pawl in the opposite direction, and a latch secured to said bar and adapted to be operated by a key for operating said bar in one direction, substantially as set forth.

3. A brake attachment for bicycles comprising an ordinary brake rod 3, teeth formed on the same, a casing clamped to the front fork of the bicycle and through which the said rod passes, a pawl co-operating with said teeth and operated by a spring in one direction, an inclined surface 15 formed on said pawl, a bar 17 having an inclined surface 18 co-operating with the inclined surface 15, a latch 20 movably secured to the bar 17 and operated by a key, a pin 22 upon which the lower end of the said latch rests, and means for elevating the said bar 17, substantially as set forth.

In testimony whereof I affix my signature in the presence of two witnesses.

FRANK T. SNYDER.

Witnesses:
JAMES J. O'DONOHOE,
C. F. KELLER.